Patented Sept. 13, 1949

2,482,062

UNITED STATES PATENT OFFICE 2,482,062

STORAGE BATTERY SEPARATOR OF POLYSTYRENE FIBER

Alden W. Hanson, Midland, Mich., assignor to The Dow Chemical Company, Midland, Mich., a corporation of Delaware No Drawing. Application January 19, 1945, Serial No. 573,628

2 Claims. (Cl. 136—146)

This invention relates to the art of making storage battery separators and similar articles, and to the product thereby obtained. It relates, in particular, to a type of microporous separator which may be made from very fine organic thermoplastic fibers.

It has long been desired in the storage battery art to make available a separator which is not only microporous but which can be stored or shipped in the dry state without injury and which can be assembled in either wet charged or dry charged storage batteries. The separators most commonly used have been made of wood and it has been necessary to keep such separators wet after they have been made until they are assembled in a finished wet charged battery. Microporous rubber has also been employed in the manufacture of battery separators, usually being used together with reinforcing matter to provide the required strength. All of the known separators leave much to be desired in the matters of low electrolytic resistance, especially at low temperatures, fragility, and resistance to attack by battery fluids.

It is accordingly among the objects of the present invention to provide a storage battery separator which is microporous, is made of good insulating material, has adequate rigidity for use under extreme service conditions and is at the same time inert to the chemical action of battery fluids. Another object is to provide a method whereby such separators may be produced from organic thermoplastic materials having suitable electrical properties and chemical resistance. A related object is the provision of a microporous separator for storage batteries composed essentially of organic thermoplastic fibers of very small diameters. Other and related objects will become apparent from the following description and the appended claims.

In accordance with the present invention, an improved separator is made from organic thermoplastic fibers having average diameters less than 15 microns, and preferably from such fibers having diameters less than 5 microns. A mass of the fibers is provided, preferably in the form of a bat or pad and is compacted under conditions and to an extent which will be described more fully hereinafter. The article formed in accordance with the invention has microporous characteristics which permit acid permeation, but do not permit so-called treeing or short circuits between the plates of a storage battery in which such separators are employed. The fibers employed in making the separators are good insulating materials and, while the separator is permeable to acid and has a low electrolytic resistance, the pores are of such small size as to offer considerable resistance to the flow of battery fluid. In this respect, the article of the present invention may readily be distinguished from microporous items which have been made in the past from coarse filaments or from relatively large particles of organic thermoplastics, and which have been intended to serve as filters for the mechanical separation of suspended solids from a fluid medium. Such prior art filters must necessarily permit the ready passage of fluid through the pores, whereas a battery separator, to operate effectively, must not pass any appreciable liquid except at the extremely low rate of a dialyzing diaphragm.

The invention, then, is a microporous separator for storage batteries comprising a coherent body of fibers having average diameters less than 15 microns, composed of an organic thermoplastic which is inert to battery liquid, said body having a degree of compaction between 30 and 60 per cent, low electrolytic resistance, and being permeable by, but resistant to, the flow of battery liquid. In a more specific and preferred embodiment, the separator of the present invention is made from polystyrene fibers having average diameters less than 5 microns.

Reference has been made to a "degree of compaction between 30 and 60 per cent." It may be explained that when a mass of fine fibers of the type here employed is compressed, as in a molding operation, it is possible, by suitable adjustment of the temperature and pressure, to obtain a molded product having any desired density up to the maximum density of the particular plastic employed; thus, while polystyrene has a density of 1.05, fine fibers of this material may be molded to form articles having pre-selected densities in the range of from as low as 0.25 up to 1.05. Similar effects can be obtained with other thermoplastic fine fibers. A 30 per cent compaction in the case of polystyrene fibers is obtained in a product having an apparent density of 0.315 gram per cubic centimeter, and a compaction of 60 per cent, in the case of a polystyrene article, represents a density of 0.630.

In making separators from fine thermoplastic fibers, it is necessary to overcome the problem of obtaining the right compaction and adequate coherence without, at the same time, sealing the surface with a plastic skin, thereby losing the required microporosity and creating a tendency for the separator to blister According to the new method herein claimed, the foregoing problem is overcome and the desired bat separators may be obtained by providing a bat or pad of the fine fibers, saturating the pad with a conditioning liquid which effects, at most, only superficial softening of the fibers, expressing excess conditioning liquid, compressing the wet fibers at a temperature below their heat distortion point to provide a coherent body having a degree of compaction between 30 and 60 per cent, and drying the so-formed article at temperatures below the softening point, and preferably below the heat distortion point.

The conditioning liquid mentioned above may be one of several types. In all cases it must be such as to exert no appreciable destructive solvent action on the fibers being treated, and the duration of the contact between the fibers and the conditioning liquid must be short enough to prevent more than superficial softening of the fibers. The conditioning liquid may contain a softening agent or it may contain an adhesive for the fibers, and is intended in any case to condition the fibers to such an extent that moderate pressure, at low temperatures, will result in the formation of a coherent article which will be microporous when the degree of compaction is between 30 and 60 per cent.

Conditioning liquids which contain adhesives, and which may be used successfully, include: (a) aqueous sodium silicate, which deposits sodium silicate on the fibers as an adhesive which is converted, upon contact with battery acid, to silicic acid; (b) aqueous gelatine, which deposits gelatine on the fibers, and which persists as an adhesive in acid batteries; (c) synthetic rubber latices or plastic emulsions which deposit the synthetic rubber or plastic on the fibers as an adhesive which is unaffected by battery fluids; and (d) natural rubber latex, which deposits rubber on the fibers as an adhesive which is not affected adversely by battery acid. Other adhesives which will contribute to the coherence of the pressed fibers, which are not adversely affected by battery liquids, and which do not materially soften the fibers during treatment, may be used in the condition liquids of the present invention.

Examples of conditioning liquids which contain softening agents for the fibers, include: (e) aqueous emulsions of active solvents for the fibers; (f) aqueous emulsions of a lacquer comprising a water-immiscible solvent and a thermoplastic solute which will serve to bind the fibers sufficiently to provide coherence when used in the process; and (g) solutions of softening agents for the fibers in a liquid which is itself a non-solvent for the fibers.

The conditioning liquids which are preferred for use in the new process are of those types identified above as (c), (e), (f) and (g), and of these the most advantageous ones are those listed under (f) and (g).

In one preferred embodiment, the conditioning liquid is an aqueous emulsion of a lacquer solution of a thermoplastic material. Thus, when the fine fibers are composed of polystyrene, they may be conditioned for the subsequent pressing operation by saturation with an emulsion consisting of from 97 to 99 per cent water, about 0.5 to 1 per cent of a wetting or dispersion agent, and from 0.5 to 2.5 per cent of a 15 to 20 per cent solution of polystyrene in toluene, ethyl benzene, or similar solvent. The disperse lacquer phase of the emulsion may similarly be a solution of an acrylic ester or methacrylic ester polymer in appropriate water-immiscible solvent. Such emulsion serves apparently to soften discontinuous portions of the fiber surfaces with which it comes in contact, and deposits on the fibers a discontinuous coating of the thermoplastic material carried in the lacquer emulsion, to serve as an adhesive or bonding agent for the fibers. Because of the thermoplastic contained in the disperse lacquer phase of the emulsion, the solvent in that lacquer exerts a minimum softening effect on the fibers, and cannot destroy them—there being little residual solvent capacity remaining in the non-aqueous phase. The wetting agent employed in the emulsion serves not only to stabilize the emulsion but also to condition the thermoplastic fibers, making them wettable by sulfuric acid or other battery liquid. For reasons which should be apparent, the wetting agent selected is preferably one which does not foam on contact with battery liquids. Several commercial wetting agents are available which meet this requirement, and Tergitol Penetrant #4 (the sulfate of a long chain secondary alcohol), Duponal ME (purified sodium lauryl sulfate), and Naccanol (sodium salt of the sulfonate of a lower alkyl naphthalene) may be named as typical examples.

In another of the preferred embodiments, the conditioning liquid is a solution of a softening agent for the fibers in a liquid which is itself a non-solvent for and is inert to the fibers. Taking again the case in which the fine fibers are composed of polystyrene, a conditioning liquid of this type may comprise acetone, or methyl ethyl ketone, or ethyl acetate as the softening agent, dissolved in such inert non-solvents as water, methyl or ethyl alcohol, ethylene glycol, glycerine, or mineral oil. These are given by way of example, it being required only that the softening agent here used be not an active solvent, but rather only a swelling agent for the fibers used, and that the inert non-solvent liquid be present in sufficiently high ratio to moderate the softening agent and to restrict its action to a mere superficial softening of the fibers. In the case of polystyrene fibers, a very effective conditioning liquid is an aqueous solution of from 15 to 35 per cent by weight of acetone, or one containing instead from 15 to 30, and preferably 20 to 25 per cent by weight of methyl ethyl ketone. This type of conditioning liquid also is a good medium for introducing into the fibers a wetting agent, to make the fibers wettable by battery liquids, and to this end from 0.5 to 2 per cent of any commercial non-foaming wetting agent may be dissolved in the conditioning liquid. Examples of suitable wetting agents have been named hereinabove.

The pad or bat of fine fibers, which may suitably be prepared as described in my copending applications Serial No. 554,210, filed September 15, 1944, now U. S. Patent No. 2,385,358, issued September 25, 1945, and Serial No. 559,612, filed October 20, 1944, now U. S. Patent No. 2,417,751, issued March 18, 1947, may be saturated with the conditioning liquid in any of several convenient ways. (The said applications disclose the drawing of fine fibers, having diameters from 0.02 micron to several microns, from viscous solutions between diverging surfaces of rotating cylinders.) Thus, the fibrous pad may be supplied in continuous form and passed through a bath of the conditioning liquid, which may be at room temperature or at a slightly more elevated temperature such as 45° C., to hasten the conditioning action, after which the pad may be pressed and cut to the desired size, or it may be first cut and then compressed. Alternatively, the pad of fibers may be supplied in short sections of a size corresponding roughly to that of the desired separator, and may be secured between matched die plates which have first been wrapped with from one to three layers of canton flannel or other absorptive material. A stack of such wrapped die plates may be dipped in the conditioning liquid, which is first absorbed by the flannel, and then transferred therefrom to the fibers when the latter have been put in place for the molding operation.

While the fibers are still wet with the conditioning liquid, pressure is applied in a manner to express excess liquid and to provide a degree of compaction in the fiber mass between 30 and 60 per cent, and preferably between 35 and 50 per cent. The pressing operation is preferably carried out at room temperature, and in no event should the pressing temperature be as high as the heat distortion point of the fibers employed. In the case of polystyrene fibers, this temperature may be as low as 72° C. (162° F.). It is noted that the usual compression molding operations on polystyrene are effected at from 240°–375° F., at pressures of from 1000 to 10,000 pounds per square inch, whereas the shaping operation of the present method, with that material, is carried out below 162° F., and usually near 70° F., at pressures of from 10 to 250 pounds, or occasionally up to 400 pounds per square inch, depending in part on the complexity of the shape being made. Thus, for perfectly flat separators, low pressures are satisfactory, while separators containing raised ribs or corrugations may require pressures upwards of 150 to 250 pounds or slightly more, to obtain accuracy in the molding. When heat is employed in the shaping and pressing operation, it must be insufficient to soften the fibers—serving mainly to hasten the effect of the conditioning liquid. The use of higher temperatures would require that the oriented fibers be held under pressure until cool, to prevent shrinkage, and might, even then, result in forming an undesirable surface skin.

The actual apparatus employed in making the new separators in accordance with the method described above is of little importance, so long as it can exert the required moderate pressure and contribute the required contour or surface deformation to the pad of wet fibers. Either compression rolls or a platen press may be used.

When the shaping and compressing operation is complete, the separator is removed from the apparatus, and dried. It may be desirable, before drying, to immerse the otherwise finished separators in water containing from 0.5 to 2 per cent, or more, of a non-foaming wetting agent, which may suitably be one of those previously named. This treatment removes, or dilutes below an effective concentration, any residual conditioning liquid and, at the same time, assures the separator of being wettable by battery liquids.

In a specific example, polystyrene fibers, having average diameters of about 1 micron, and maximum diameters of not much over 2 microns, were prepared in the form of a loose bat or pad, with the fibers lying substantially parallel to one another and to the surface of the pad, which was about 0.35 inch thick. The pad was saturated with an aqueous emulsion heated to 45° C., consisting of 98.8 parts of water, 0.5 part of Tergitol Penetrant #4 (a wetting agent), and 0.7 part, all by weight, of a 20 per cent solution of polystyrene in an 85:15:10 mixture of isopropyl benzene:ethyl benzene:toluene. The pad was pressed between polished steel plates, to a thickness of 0.025 inch. Further compaction was prevented by a spacer of that thickness around the periphery of the platens. The excess liquid was expressed and compaction was obtained using a pressure of 50 pounds per square inch. No heat was supplied to the press, but the fibers had been warmed to about 45° C. by the conditioning liquid. The separator was removed from the press and dried in air at 50° C. It was microporous, permitting passage of liquid only at the slow rate characteristic of dialyzing diaphragms, and had the extremely low electrolytic resistance of 0.025 ohm per square inch. The product was less fragile than either the usual wood or microporous rubber separators, and could be shipped and stored in a dry condition. When incorporated in storage batteries it was unaffected by battery acid, and was found to prevent "treeing" and short circuits between the plates. Its electrolytic resistance at low temperatures was lower than that of either wood or rubber separators, and hence batteries containing the new separator are more efficient at low temperatures than the usual automotive battery heretofore supplied.

In another example, matched die plates of the desired size and contour were individually jacketed with 3 layers of canton flannel. The plates were then dipped into a 22 per cent solution of methyl ethyl ketone in water, until the flannel was saturated. A pad of parallel polystyrene fibers with average diameters of about 2 microns was placed between the plates, and pressure of 15 pounds per square inch was applied at room temperature to express excess conditioning liquid and to effect compaction of the sheet. Pressure was released after 15 seconds, and the separator had assumed the desired shape. It was then immersed in a 0.5 per cent solution of Duponal ME (a non-foaming wetting agent) in water, to remove or dilute below effective concentration any remaining methyl ethyl ketone, and to make the separator subsequently wettable by battery acid. The separator was then air dried at 40° C., and had an electrolytic resistance of only 0.027 ohm per square inch.

In the preparation of battery separators according to the invention, the method described in the last example has been employed using, alternatively, a 10-high stack of press plates having desired surface configuration to produce at one time 9 battery separators, or a single pair of plates about 30 inches by 48 inches to produce 40 separators at one time, each separator being approximately 6 inches square. As another alternative procedure, the pad of conditioned fibers has been passed between suitably profiled pressure rollers to obtain the desired shape and compaction, and has been cut transversely at the proper intervals to provide the desired separators. So far as the process is concerned, the various suggested alternative pressing and shaping means are equivalents, judging from the articles produced.

Particular reference has been made herein to separators made from extremely fine fibers of polystyrene. These are believed to be superior to separators made from other thermoplastic fine fibers, partly due to the inherent inertness of such hydrocarbon fibers to the usual battery liquids. The invention is not limited to polystyrene separators or to a method of operation on that thermoplastic alone. Other plastics which are capable of being drawn to form fine fibers having diameters less than 15 microns, and preferably less than 5 microns, and which are inert to the action of battery liquids, may be used in the invention. These include, in suitable cases, such thermoplastics as polyethylene; polymethyl methacrylate; the "Vinylite" type of vinyl chloride and vinyl acetate copolymer; the "Acryloid" type of methyl methacrylate and ethyl acrylate copolymers; the copolymers of vinylidene chloride with vinyl chloride, vinyl acetate, ethyl acrylate, methyl methacrylate, butadiene, styrene, and similar materials, so long as the composition is capable of forming fine fibers by any of the known methods, including that described in my aforesaid copending applications; or any other organic thermoplastic, fiber-forming substance which is inert to battery liquids.

When using the herein-described method, the new separators have been made as thin as 0.005 inch, which may be contrasted with 0.035–0.040 inch for the usual wood separators. The new article has typical electrolytic resistance at normal operating temperatures of 0.022 to 0.030 ohm per square inch, and in some cases as low as 0.011 ohm, as contrasted with typical values of 0.035 for microporous rubber and 0.040–0.045 for wood separators. At freezing temperatures, where the usual wood separators exhibit abnormally high resistance, the new product continues to have such low resistance values as 0.025–0.030 ohm per square inch. The new product may be packed and shipped in the dry state, and may be used in dry-charged batteries, while wood separators may not be so-employed. The new product is less brittle than the available rubber separators, which, in turn, are far less brittle than the traditional wooden product, and for this reason the new separators may be "packed" into batteries on the assembly line with far less than the normal amount of breakage heretofore encountered, figures of less than 5 per cent breakage on assembly having been reported by battery manufacturers. Because of the peculiar nature of the fibrous mass from which the separators are made, any type of corrugation, dimple, or rib may be pressed into the product during its manufacture. This may be done without altering the electrolytic resistance of the separator, since such surface variations need not change the thickness of the separator at any point. When stiff ribs are more desirable than uniform density, the rib portion may be made thinner and denser than the main body of the separator, by locally applied higher shaping pressures. It is to be understood, of course, that ribs of added material may be cemented on to the new separators in the customary way, if desired.

The description herein has referred in several instances to a pad or bat of fine fibers in substantial parallelism. This is a preferred arrangement, and is readily attained when the fibers are produced in accordance with my mentioned copending applications, but is not in all cases essential to the invention. Thus, satisfactory products may be made from mats of heterogeneously disposed fibers, such as felted sheets of fibers which, for example, may be formed on a paper machine of either the screen or cylinder type. An advantage of the substantially parallel disposition of the fibers resides in the uniformly small pore size, and accordingly the uniformly low electrolytic resistance, available when the product is pressed from such a mat. Another advantage of fibers in substantial parallelism, lies in the possibility of forming articles in which the fibers lie generally transverse to the direction of molded ribs, thereby giving the required amount of strength and rigidity in both directions, even with very thin separators.

The description has been made exclusively with respect to battery separators. It is to be understood that, while the provision of such separators was the prime object of the herein described inventions, other articles may be produced by the same method wherever microporosity is required in an organic thermoplastic item. An example of such an article, in which microporosity is required with a high resistance to the actual throughput of liquid, is a dialyzing diaphragm.

This application is a continuation-in-part of my prior and copending application Serial No. 529,712, filed April 6, 1944.

I claim:

1. A separator for storage batteries consisting essentially of a compressed coherent microporous body of substantially parallel polystyrene fibers having diameter between 0.02 and 5 microns, said body having an apparent density of from 0.315 to 0.630, low electrolytic resistance, and being permeable by, but resistant to the flow of battery liquid.

2. A battery separator which is microporous and consists esentially of compressed coherent polystyrene fibers all lying substantially parallel to one another and having average diameters in the general order of 2 microns, said separator having an apparent density of from 0.315 to 0.630.

ALDEN W. HANSON.

REFERENCES CITED

The following references are of record in the file of this patent:

UNITED STATES PATENTS

| Number | Name | Date |
|---|---|---|
| 2,015,006 | Ekisler | Sept. 17, 1935 |
| 2,117,371 | Slayter | May 17, 1938 |
| 2,131,024 | Cordts | Sept. 27, 1938 |
| 2,133,236 | Slayter | Oct. 11, 1938 |
| 2,271,829 | Powers | Feb. 3, 1942 |
| 2,277,049 | Reed | Mar. 24, 1942 |
| 2,297,248 | Rudolph | Sept. 29, 1942 |
| 2,306,781 | Francis, Jr. | Dec. 29, 1942 |
| 2,335,757 | Hall | Nov. 30, 1943 |
| 2,354,744 | Dreyfus | Aug. 1, 1944 |
| 2,357,392 | Francis, Jr. | Sept. 5, 1944 |
| 2,405,978 | Pickles et al. | Aug. 20, 1946 |
| 2,430,868 | Francis, Jr. | Nov. 18, 1947 |

OTHER REFERENCES

Pages 240–241 of Handbook of Plastics; author, Simonds-Ellis; published in 1943 by D. Van Nostrand Co., 250 Fourth Avenue, New York city.

Goggin et al., Modern Plastics, July 1944, pages 101, 102 and 106.